US005578655A

United States Patent [19]
Fiorentini

[11] Patent Number: 5,578,655
[45] Date of Patent: Nov. 26, 1996

[54] APPARATUS AND PROCESS FOR THE PRODUCTION OF FROTHED POLYURETHANE FOAMS

[75] Inventor: Carlo Fiorentini, Saronno, Italy

[73] Assignee: Foaming Technologies Cardio B.V., Netherlands

[21] Appl. No.: 584,274

[22] Filed: Jan. 11, 1996

[30] Foreign Application Priority Data

Jan. 12, 1995 [IT] Italy .................................. MI95A0053

[51] Int. Cl.⁶ ........................................................ C08G 18/00
[52] U.S. Cl. ................................................ 521/155; 521/917
[58] Field of Search .................................... 521/155, 917

[56] References Cited

U.S. PATENT DOCUMENTS

| 5,223,552 | 6/1993 | Reinink ................................. 521/155 |
| 5,443,797 | 8/1995 | Proksa et al. ......................... 521/155 |
| 5,472,990 | 12/1995 | Craig et al. ......................... 521/155 |

Primary Examiner—Morton Foelak
Attorney, Agent, or Firm—Cushman Darby & Cushman IP Group of Pillsbury Madison & Sutro LLP

[57] ABSTRACT

An apparatus and a process for the production of frothed polyurethane foams: the reactive polyurethane components are mixed with a liquid low-boiling blowing agent and a nucleation gas by a mechanical mixer under pressure controlled conditions in a mixing chamber to keep the blowing agent in the liquid state and cause a fine dispersion of the nucleation gas. The reactive polyurethane components, the blowing agent and the nucleation gas are mixed by reverse flowing the mixture in respect to centrifugal forces generated by a rotor member in the mixing chamber, and by subjecting the same mixture to repeated stirring and whirling actions while it is flowing towards a central discharge outlet and circulating in a radially extending annular path, between facing surfaces of the rotor member and a bottom wall of a mixing chamber provided with intermeshing sets of axially extending pegs.

9 Claims, 1 Drawing Sheet

APPARATUS AND PROCESS FOR THE PRODUCTION OF FROTHED POLYURETHANE FOAMS

FIELD OF THE INVENTION

The present invention relates to the production of polyurethane foams by means of a low-boiling auxiliary blowing agent, preferably an inert or non reactive blowing agent such as liquid $CO_2$, according to the known frothing technique; more particularly it is concerned with a mechanical mixer suitable for the production of rigid or flexible polyurethane foams in the manufacture of insulations, panelling, cushioning and polyurethane slab-stocks.

BACKGROUND OF THE INVENTION

Polymeric foams, in particular polyurethane foams are well-known and in general their preparation requires the mixing of liquid reactive chemical components, such as a polyole and an isocyanate, with additives such as a catalyst, a surfactant and a foaming agent for controlling the cellular structure of the foam, for example water which chemically reacts with the isocyanate in order to produce the required quantity of carbon dioxide necessary for the expansion of the foam. Moreover, to allow the foaming to start, it is necessary to perform the dispersion, in the liquid mixture, of a certain quantity of a gaseous nucleation agent, such as nitrogen, air or other inert gas which must be finely subdivided into "nucleides" or small-size bubbles suitable for promoting the foaming process.

In the continuous production of foams, in particular in the production of flexible foam slab-stocks as is currently performed by conventional methods, a thin layer of a polyurethane mixture in the liquid state is poured or spread on a moving substrate provided on a conveyor, allowing the foam to freely rise owing to the formation of gaseous $CO_2$ caused by the chemical reaction between the chemical components, until total expansion of the foam is obtained. Conventional processes and apparatuses are described for example in the U.S. Pat. No. 3,325,823, U.S. Pat. No. 4,492,664 and U.S. Pat. No. 3,184,419.

The pre-expansion of the polyurethane mixture by means of a low-boiling blowing agent, which is preferably inert, for example liquid $CO_2$ —more commonly known as "frothing"—is also a well-known technique and proposed in varying forms in polyurethane technology; this technology has been recently improved by the same Applicant with regard to the continuous production of polyurethane slab stocks in order to overcome numerous drawbacks which occur with apparatuses or with prior known processes which in practice have proved difficult to carry out.

In particular, according to the technology developed by the same Applicant, which has formed the subject of prior patent applications EP-A-0 645 226, it has been established that in the production of polyurethane foams the use of pressure controlled conditions during mixing positively influences the formation of the cells during the subsequent pre-expansion or frothing phase, before the chemical reaction between the components and polymerisation of the polyurethane mixture will start.

In the practical implementation of the foaming processes using the frothing technique by means of a low-boiling inert blowing agent, in general it has also been proposed to use mixers of mechanical type, in which mixing of the chemical components, blowing agent and nucleation gas occurs by a stirring action along a path which extends substantially in the axial direction inside the mixer, in the direction in which the same mixture flows towards a delivery opening. Mechanical mixers with a substantially axial progression of the flow during the mixing are described in numerous prior patents and in particular in U.S. Pat. No. 3,184,419.

In mechanical mixers of this type, however, there is a very rapid flowing of the mixture along the axial path in the mixing chamber, where the mixture is subjected to a stirring action conjointly to a strong centrifugal action tending to cause separation between the gaseous phase of the nucleation agent and the liquid phase of the polyurethane components; this results in the formation of preferential flows of separated components and irregular bubbles of nucleation gas, which give rise to the formation of large cavities or pin-holes in the polyurethane foam negatively influencing the quality and characteristics of the same foam. In practice it has been established that, there may be the formation of both small cavities or bubbles in a substantially homogeneous cellular structure, and large-size cells which undoubtedly originated inside the mixer.

OBJECT OF THE INVENTION

The Applicant, after successfully developing a method for the pre-expansion of polyurethane foams by means of liquid $CO_2$, which resulted in the possibility of adopting in practice the frothing technique for many applications, and following extensive experimentation, established that it is possible to improve considerably the production process and the quality of the foams, by performing a special mixing phase and adopting a special design for the mixer.

The general object of the present invention is therefore to provide an improved apparatus for the production of frothed polyurethane foams, by means of which a mixing phase is performed under control led conditions by a mechanical mixer, resulting in an improved mixing of a blowing agent and dispersion of a nucleation gas in the mixture, and the quality of the foam, with total elimination of large bubbles or irregular cells in the polyurethane foam thus obtained. The invention is applicable equally well to the processes for the production of polyurethane foams of both the closed-cell and open-cell type.

A further the object of the present invention is to provide a process for the production of pre-expanded polyurethane foams by the known frothing technique, whereby the mixing of the chemical components and the inert blowing agent, in a liquid state, with a nucleation gas is performed under pressure controlled conditions, by mixing the polyurethane components, the blowing agent in the liquid state and dispersing a gaseous nucleation agent by means of a specially designed mechanical mixer, while the resulting mixture is flowing along a path suitable for causing a fine dispersion of the nucleation gas and avoiding the formation of preferential flows, thus obtaining a correct and complete mixing action.

The above can be achieved by means of a mixing apparatus and a process for the production of pre-expanded polyurethane foams, according to claims 1 and 8.

In particular, the invention relates to an apparatus for the mixing polyurethane chemical components comprising: a mechanical mixing device in which mixing of reactive polyurethane components, a liquid blowing agent and a gaseous nucleation agent may be performed under pressure controlled conditions, said mixing device comprising a hollow body having a cover member, a peripheral wall, and a bottom wall provided with a central discharge opening, a rotor member rotatably supported in said hollow body, and in which the mixing device comprises inlet openings for feeding the polyurethane components, for said liquid blowing and nucleation gas, characterized in that opposed facing surfaces of said rotor member and bottom wall of the hollow body define an annular mixing chamber radially extending from the peripheral wall of said hollow body towards the central discharge opening of said bottom wall, said facing surfaces of the mixing chamber having a plurality of intermeshing axially projecting pegs.

The invention relates also to a process for the continuous production of pre-expanded polyurethane foams, comprising the steps of performing a mixture of reactive chemical components comprising an inert low-boiling blowing agent and a gaseous nucleation agent, in a mechanical mixing device having a mixing chamber and a rotor member rotatably supported in said chamber for mixing said chemical components, the blowing agent and the gaseous nucleation agent at a pressure sufficient to keep said blowing agent in a liquid state; pre-expanding the resulting mixture by causing it to froth, and subsequently discharging the frothing mixture onto a moving substrate, wherein mixing of the reactive chemical components and the blowing agent as well as the dispersion of the gaseous nucleation agent in said mixer occurs under stirring controlled conditions, by reverse flowing the resulting mixture, in respect to the centrifugal forces, along a mixing path inside the mixing chamber radially extending between opposing surfaces both provided with opposing and intermeshing projecting pegs which axially extend in the mixing chamber, such that the mixture is subjected to a repeated mechanical stirring actions and whirling movements while it is flowing around an annular path and in a radial direction towards a central delivery point.

Contrary to what could be logically expected on the basis of previous experience with mechanical axial-type mixers, the use of a radial mixer surprisingly revealed that it was possible to obtain frothed polyurethane foams of improved quality, something which was not foreseeable and obtainable with conventional or previously known systems.

BRIEF DESCRIPTION OF THE DRAWINGS

The invention will be described in greater detail hereinbelow with reference, by way of example, to the continuous production of polyurethane foams in slab-stocks foam, it being understood, however, that the invention may also be suitable for other applications. In the drawings.

DETAILED DESCRIPTION OF THE INVENTION

Figure 1:
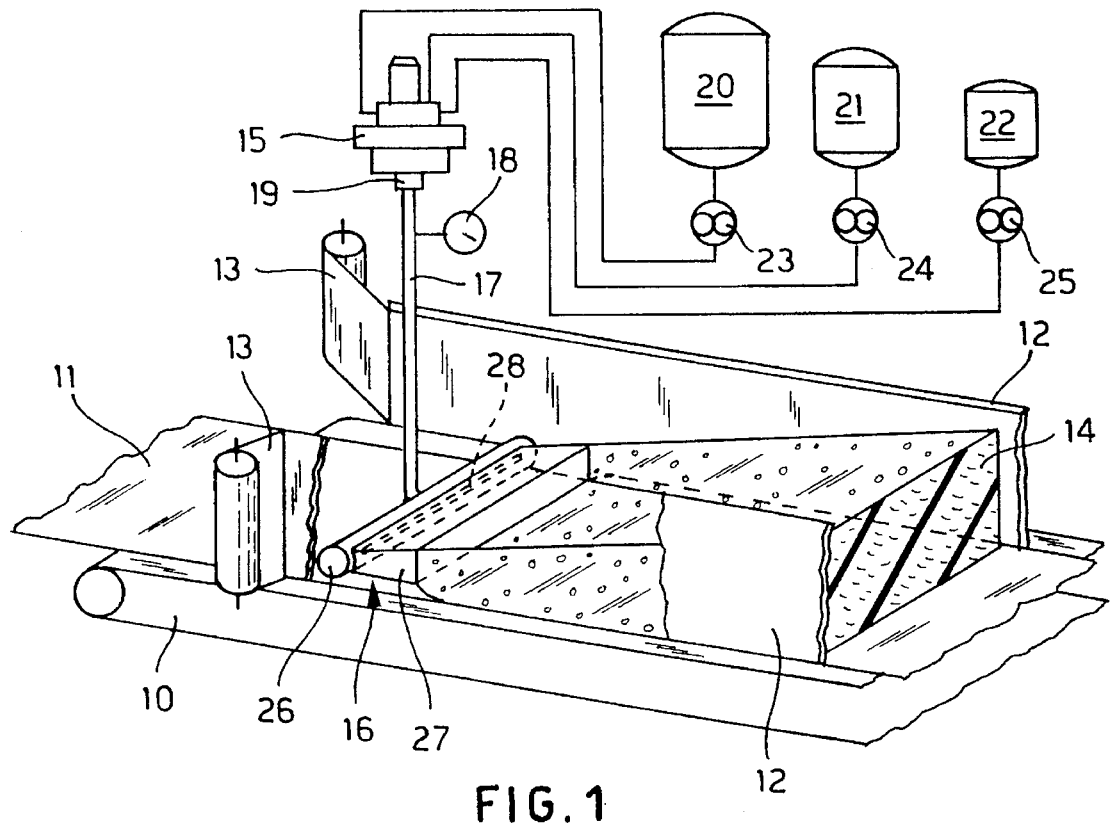
FIG. 1 perspective view of an apparatus for the continuous production of polyurethane slab-stock foam by means of the mixing and foaming process according to the present invention.

The invention and its main features are described hereinbelow with reference to the example of the accompanying drawing. As shown, a plant for the continuous production of expanded polyurethane foams, in a possible embodiment thereof, substantially comprises a continuous conveyor 10, on which a substrate 11 in the form of a paper strip or other suitable material is made to advance. The plant, moreover, is provided with two lateral walls 12 perpendicularly arranged to the conveyor 10, in order to support and guide lateral sheets 13 consisting of continuous paper strips arranged to travel in contact with and move inside each wall 12 in order to retain laterally the polyurethane foam 14 during expansion.

The bottom paper strip 11, with its edges folded upwards, where necessary, and the two lateral paper strips 13 form a kind of continuous open top channel, into which a frothing polyurethane mixture obtained by a mixing apparatus according to the present invention, is continuously supplied.

The apparatus substantially comprises a radial-action mechanical mixer 15 connected to a device 16 for frothing and distributing the mixture, by means of a duct 17.

A pressure gouge 18 is provided in the vicinity of the outlet 19 of the mixer, so as to indicate the pressure of the mixture of chemical components as they leave the mixing chamber.

Tanks 20, 21 and 22 are provided in order to contain the reactive chemical components such as a polyole and an isocyanate, commonly used chemical additives, a low-boiling blowing agent, of the inert type, such as liquid $CO_2$ and a suitable nucleation gas such as air or nitrogen. From each of the containers 20, 21 and 22, the chemical components, the additives, the expansion agent and the nucleation gas are supplied to the mixer 15 by respective pipes and volumetric pumps 23, 24 and 25, as shown.

According to the example of FIG. 1, the outlet 19 of the radial mixer 15 is connected, via the pipe 17, to a lay-down device 16 for distributing and frothing the mixture, which extends transversely substantially over the entire width of the substrate 11 on the conveyor 10.

The frothing device 16 as described in the previous EP-A-0 645 226, comprises means for causing a controlled pressure drop in the mixture sufficient to generate, inside the chamber of the mixer 15, a pressure to keep the blowing agent in liquid form, as well as comprises a frothing cavity to ensure gradual release of the blowing agent to cause the frothing of the resulting polyurethane mixture.

More particularly, the device 16 comprises an elongated pressure-equalization chamber 26 which leads into a frothing diffuser 27 through a narrow slot 28 which extends on one side of the pressure equalization chamber 26, substantially over the entire width of the block of foam 14 to be produced. The slot 28, which causes a controlled drop of the pressure in the mixture, as described in previous EP-A- 0 645 226 may have any suitable shape, for example may consist of a continuous slot or a succession of small holes or of several slots of limited length aligned over the entire width of the chamber 26, which extend in the flow direction for a length greater than the height of the slot, to generate the required pressure in the mixing chamber and to ensure that the frothing polyurethane mixture is delivered gently by a laminar flow onto the substrate 11 while the said mixture is flowing in the moving direction of the conveyor.

As previously mentioned, the innovative aspects of the present invention lie in a mechanical mixer 15 to ensure that mixing of the chemical components and a blowing agent as well as the dispersion of a gaseous nucleation agent are performed along a substantially radial path which avoids the formation of preferential flows, so as to provide an intense and repeated mechanical mixing action as well as whirlings while the mixture is forced to flow radially reverse to the centrifugal forces generated by the rotational movement, towards a central delivery opening.

Figure 2:
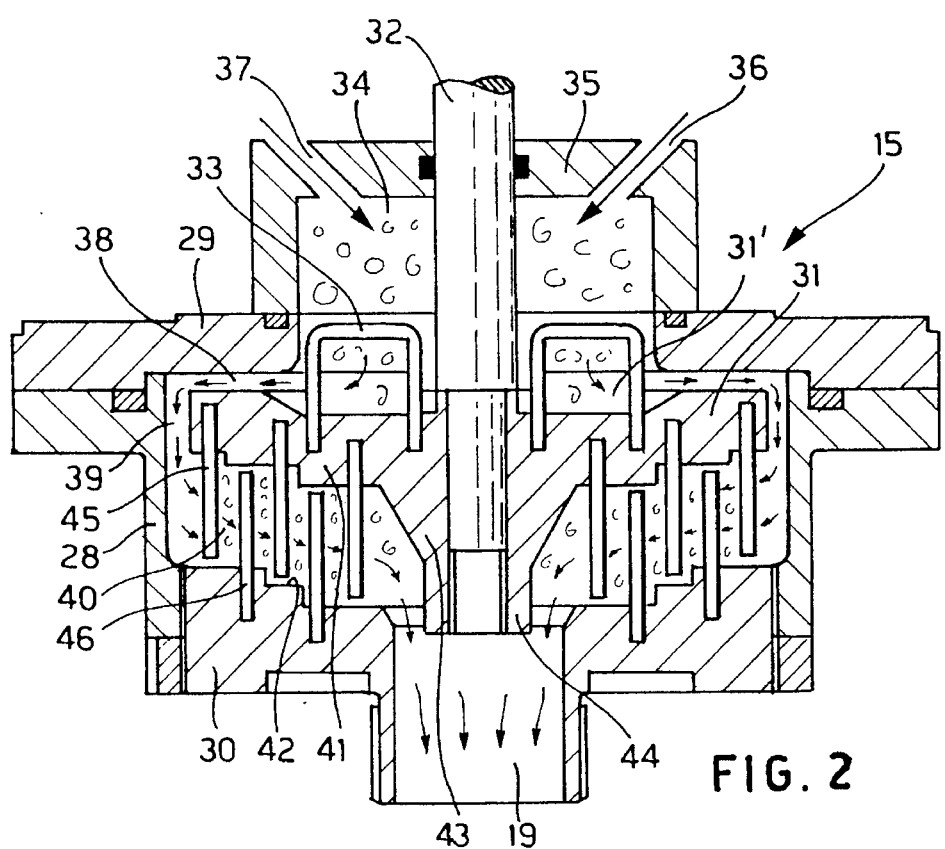
FIG. 2 is a section, on a larger scale, through the radial mixer used in the apparatus of FIG. 1.

More precisely, according to the example of FIG. 2, the radial mixer 15 substantially comprises a hollow body 28 closed by a cover 29 at the top and by a bottom-piece 30 having centrally a delivery outlet 19.

The cylindrical body 28, the top cover 29 and the bottom-piece 30 define, together, a cylindrical mixing chamber inside which a rotor member 31 connected to a motor driven shaft 32 rotates; the rotor member 31 is substantially disc-shaped so as to define, with the internal bottom wall of the mixer chamber, a mixing path having a substantially radial progression along which the mixture flow is guided to emerge from the central delivery outlet 19.

The radial mixer according to the present invention is to perform mixing of the liquid components and dispersion of the nucleation gas backflowing along a radial path, by means of a vigorous and repeated mechanical stirring action, at the same time imparting the mixture locally whirling actions while the same mixture is flowing and circulating along an annular path which extends in the radial direction, from the peripheral wall of the mixing chamber, towards the central delivery point 19, against the action of the centrifugal forces which favourably increase the whirling and the mixing action of the intermeshing pegs into the mixture flowing under pressure controlled conditions.

The main mixing action which takes place along the radial path 40 of the mixer can be preceded by a first blending action of the chemicals and additives in a pre-mixing chamber 34 on the side of the rotor 31 which is opposite to said radial mixing path; into the pre-mixing chamber 34 the chemical components, additives and the blowing agent to be mixed with the nucleation gas, are initially supplied at a pressure comprised for example between 5 and 20 Atm, sufficient to keep the blowing agent in a liquid state during mixing and before delivering in a frothing state.

As shown in FIG. 2, the rotor 31 is in the form of a disc like member, the side of which facing towards the cover 29 has a circular cavity 31' having projecting U-shaped bridge-pins 33 and/or pegs which extend towards a pre-mixing chamber 34 inside a rear cup-shaped extension 35 of the cover 29 in which inlet openings 36, 37 are provided for feeding the components to be mixed.

The substantially flat rear face of rotor disc 31 is axially spaced apart from the internal surface of the cover 29 so as to form an annular path 38 for flowing of the pre-mixed components, which extends from the pre-mixing chamber 34 towards a short annular channel 39 which peripherally extends in the direction of the axis of the rotor member 31, for supplying the pre-mixed components towards the main mixing chamber 40.

The main mixing chamber 40, in the example shown, is in the form of a stepped annular chamber which extends radially from the peripheral wall of the mixer body 28, towards the central delivery mouth 19; the mixing path inside the chamber 40 on one side is delimited by a stepped wall 41 or front face of the rotor member 31, while on the other side it is delimited by a similar stepped wall 42 on the opposite wall of the closing bottom-piece 30. The disc-like rotor 31 is provided moreover with a central frustoconical core 43 protruding into the mixing chamber 40 and terminating in a cylindrical part 44 which extends partially into the discharge hole 19 so as to deviate axially downwards the mixture which flows radially inside the chamber 40, while it is entrained in rotation by the rotor 31.

In order to increase the mixing effect of the chemical components and fine dispersion of the nucleation gas, in particular in order to impart to the mixture a vigorous mechanical stirring action and localized whirling movements while the mixture, consisting of a liquid and a gaseous phases, radially flows back wards the centrifugal forces, towards the central delivery opening 19, the front stepped surface 41 of the rotor 31 is provided with a plurality of axially projecting pegs 45 arranged one or more circumferences concentric with the axis of the said rotor, which are intermeshing with corresponding sets of pegs 46 projecting from the stepped surface 42 of the bottom-piece 30 to be intermediate with respect to the moving pegs 45 of the rotor.

The dimensions, the length and the arrangements of the pegs 45 and 46 which impart a vigorous and repeated mechanical stirring actions and a strong whirling to the mixture may also vary with respect to those shown; in general, in the example shown, said pegs extend until they terminate practically in the immediate vicinity of the opposing wall, to define intermeshing comb arrangements to prevent preferential flows from arising in the said mixture, thus improving the efficiency of the mixing action and complete dispersion of the nucleation gas. The stepped configuration of the opposing surfaces of the rotor 31 and the bottom-piece 30 in the radial chamber 40 could also change with respect to that shown and has been designed in order to further increase the mixing effect while the mixture flows radially from the peripheral part of the chamber 40 towards the central delivery outlet 19.

From tests and experiments carried out, it has been established that the use of a radial mixer according to the invention, in combination with a process for frothing a polyurethane mixture, has practically eliminated or reduced significantly the formation of large bubbles in the foam, resulting in all cases in a polyurethane foam with a perfectly regular homogeneous cellular structure of high commercial quality.

The example described illustrates a particular design of a radial mixer which, from the tests carried out, has provided the best results; however, it is obvious that, without departing from the principles of the present invention, it is possible to use another form or other design for the radial mixer, in combination with a pre-expansion device, achieving in all cases results which are relatively better and unexpected compared to that which has been obtained with conventional mechanical mixers, in which mixing is performed along a peripheral path having a substantially axial progression.

It is understood, therefore, that the above description and illustrations with reference to the accompanying drawing have been provided purely by way of a non-limiting example of the general principles of the invention which is claimed.

What is claimed is:

1. A process for the continuous production of a pre-expanded polyurethane foam for producing frothed polyurethane slab stock comprising the steps of: forming a liquid mixture comprising reactive chemical components, a liquid low boiling blowing agent and a nucleation gas; mixing the chemical components, the liquid blowing agent and the nucleation gas in a mechanical mixer comprising a mixing chamber having a central discharge opening in a bottom wall, and a rotor member rotatably supported inside the mixing chamber for mixing the chemical components, the blowing agent and the nucleation gas at a pressure sufficient for keeping the blowing agent in a liquid state; the mixing step inside the mixing chamber is performed by conveying the resulting mixture along a mixing path in the mixing chamber radially extending between opposing surfaces of the rotor member and the bottom wall, and by subjecting the mixture to repeated and intense mechanical stirring and whirling actions while the same mixture is radially reverse flowing, in the mixing path, in respect to centrifugal forces generated by the rotor member, towards the central discharge opening; and discharging a resulting mixture through a frothing device thereby frothing the mixture under pressure controlled conditions.

2. A process according to claim 1, comprising pre-mixing the chemical components, the liquid blowing agent and the nucleation gas in the mechanical mixer, upstream of the mixing path and before flowing the resulting mixture in the mixing chamber of the mixing device.

3. A process for the continuous production of a pre-expanded polyurethane foam slab-stock in which a frothed polyurethane material is continuously fed onto a moving substrate, comprising the steps of: forming a liquid mixture of reactive chemical components, a liquid low-boiling blowing agent and a nucleation agent, mixing said chemical components, said liquid blowing agent and said nucleation agent in a mechanical mixer comprising a mixing chamber having a central discharge opening in a bottom wall, and a rotor member rotatably supported inside the mixing chamber, the mixing of the chemical components, the blowing agent, and the nucleation agent being performed at a pressure sufficient to maintain the blowing agent in a liquid state, conveying the resulting mixture along a mixing path in the mixing chamber radially extending from the periphery of the mixing chamber to the central discharge opening and subjecting the mixture to repeated and intense mechanical stirring and whirling actions while the same mixture in the mixing path is radially reverse flowing with respect to centrifugal forces generated by the rotor member towards the central discharge opening, and frothing the resulting mixture by flowing through a frothing device.

4. A process for the continuous production of a pre-expanded polyurethane foam slab-stock in which a frothed polyurethane material is continuously fed onto a moving substrate, comprising the steps of: forming liquid mixture of reactive chemical components, a liquid low-boiling blowing agent and a nucleation agent; mixing the chemical components, the liquid blowing agent and the nucleation agent in a radial mixer comprising a mixing chamber having a central discharge opening in a bottom wall, and a rotor member rotatably supported inside the mixing chamber, the mixing of the chemical components, the blowing agent and the nucleation agent being performed at a pressure sufficient to maintain the blowing agent in a liquid state; the mixing step including conveying the resulting mixture along a radially extending mixing path in the mixing chamber between opposing surfaces of the rotor member and the bottom wall, and subjecting the mixture to repeated and intense mechanical stirring; discharging a resulting mixture from the discharge opening, and frothing the discharged mixture by causing the discharged mixture to pass through a frothing device.

5. A process according to claim 4 wherein the step of mixing further includes radial flow reversals as the mixture is subjected to centrifugal forces generated by the rotor member.

6. A process as in claim 4 wherein the mixing step occurs in an annular mixing chamber that establishes flow radially therein between the periphery of the mixing chamber and the central discharge opening.

7. A process as in claim 4 wherein the radially extending flow is created by the mixture passing across a stepped interior within the mixing chamber.

8. A process as in claim 4 wherein the mixing step further includes the step of premixing at least the blowing agent, the reactive chemical components, and the nucleation agent.

9. A process for mixing polyurethane chemical components comprising the steps of feeding reactive polyurethane components, a liquid blowing agent and a nucleation agent into a mechanical mixing device having a hollow body, a cover member, a peripheral wall, and a bottom wall provided with a central discharge opening, a rotor member rotatably supported in the hollow body, placing the hollow body and the reactive polyurethane components, the liquid blowing agent and the nucleation agent under pressure controlled conditions, mixing the contents within the mixing device by providing on opposed facing surfaces of the rotor member and the bottom wall, respectively, which define an annular mixing chamber therebetween that extends radially from the peripheral wall of the hollow body towards the central discharge opening, with a plurality of intermeshing axially projecting pegs disposed along coaxial circumferences of the rotor member and the bottom wall and creating relative rotational movement therebetween thereby mixing together the contents in the annular mixing chamber by subjecting the mixture therein to repeated and intense mechanical stirring action and discharging the mixture from the mixing device.

\* \* \* \* \*